United States Patent Office 3,498,831
Patented Mar. 3, 1970

3,498,831
COLORING OR PRINTING CELLULOSIC FIBROUS MATERIAL WITH NONMETALLIC PIGMENTS
Reinhold Krallmann, Ludwigshafen (Rhine), Wilhelm Federkiel, Frankenthal, Pfalz, and Gerhard Faulhaber, Mannheim, Germany, assignors to Badische Anilin- & Soda-Fabrik Aktiengesellschaft, Ludwigshafen (Rhine), Germany
No Drawing. Filed Jan. 10, 1966, Ser. No. 519,433
Claims priority, application Germany, Jan. 14, 1965, 1,469,617; July 1, 1965, 1,469,636
Int. Cl. C08j 1/36; C08d 13/16
U.S. Cl. 117—143
7 Claims

ABSTRACT OF THE DISCLOSURE

Cellulosic fibrous material is dyed or printed with nonmetallic pigments by applying to said material an aqueous solution of (a) a quaternary homopolymer or copolymer of vinylimidazole and, simultaneously or afterwards, an aqueous dispersion of (b) a nonmetallic pigment which contains (c) as a dispersing agent ethylene oxide adducts or their sulfuric acid hemiesters, and optionally may contain (d) a high molecular weight film-forming polymer free from anionic groups in a nonionic or cationic dispersion, in the absence of strongly anion-active substances, the weight ratio of (a):(b) being from 0.1:1 to 50:1, and the weight ratio of (c):(b) being from 0.1:1 to 2:1, and the substances (d) being employed in amounts up to 40 grams per liter of coloring liquor or up to 40 grams per kilogram where a printing paste is used.

This invention relates to a process for coloring or printing cellulosic fibrous material with nonmetallic pigments. The invention also relates to the fibrous material colored or printed by the said process.

It is known that textile material may be colored or printed with pigments by applying the pigments together with solutions or dispersions of high molecular weight film-forming substances (called pigment binders) to the material and bonding the pigments to the material by the pigment binder which may if necessary be crosslinked. Prior art methods of this type have the disadvantage that they will only give colorations and prints having good fastness when large amounts of pigment binder are used. This makes such methods appreciably more expensive; what is more, the handle of the colored or printed material is affected very unfavorably.

It is an object of the invention to color fibrous material in shades having good fastness properties without using the large quantities of conventional pigment binders that have been required hitherto. It is another object of the invention to prepare colorations and prints with non-metallic pigments which are distinguished by a particularly pleasant handle. It is yet another object of the invention to prepare such colorations and prints in a particularly economical manner. Further objects will be evident from the following description.

We have found that these objects can be achieved by treating cellulosic fibrous material (i.e., fibrous material which consists of or contains cellulose) in the absence of strongly anion-active substances, preferably in the absence of any kind of anion-active substances, with aqueous solutions of quaternary ammonium compounds of polymers or copolymers of a vinylimidazole and simultaneously or subsequently treating the material with aqueous pigment dispersions of nonionic or weakly anion-active dispersing agents, preferably nonionic dispersing agents.

The polymers or copolymers of a vinylimidazole include not only poly-N-vinylimidazole but also polymers of other vinylimidazoles, for example those of N-vinyl-2-methylimidazole, N-vinyl-2-phenylimidazole, N-vinyl-2-methylolimidazole, N-vinylbenzimidazole or 2-vinylbenzimidazole, and copolymers of these compounds with each other or with other polymerizable compounds which do not contain basic groups and preferably do not contain acid groups, such as acrylonitrile, acrylic esters, methacrylic esters, acrylamide, methacrylamide, styrene and vinylpyrrolidone.

Since the activity of the polymers declines as the content of such non-basic monomer units increases, those polymers are preferred which contain at least 50% by weight of units of one or more vinylimidazoles. Poly-N-vinylimidazole is particularly advantageous economically. The chain length of the polymers is not of considerable importance for their usefulness; very good results are achieved with polymers having a mean molecular weight of 5,000 to 30,000, preferably of 10,000 to 20,000, but polymers having lower or higher molecular weights may also be used.

The polymers are used in the form of their quaternary ammonium compounds such as are obtained for example by treating the polymers or copolymers with quaternizing agents, such as alkyl chlorides, aralkyl chlorides, monoalkyl sulfates, dialkyl sulfates or esters of sulfonic acids. Preferred quaternizing agents are those which introduce alkyl radicals having one to four carbon atoms into the polymers or copolymers, e.g., dimethyl sulfate, diethyl sulfate, methyl p-toluenesulfonate or isobutyl p-toluenesulfonate. The polymers will hereinafter be referred to as cationic polymers for simplicity's sake.

Any pigments which do not have metallic character are suitable for the process according to the present invention. Examples are: inorganic pigments, as for example carbon black, iron oxides, manganese oxides, titanium dioxide, lead chromate and cadmium sulfide, and preferably organic pigments, for example those from the series of metal-free or metal-containing phthalocyanies, polycyclic dyes consisting of at least three rings and containing keto groups, such as the anthraquinoid and indigoid dyes, quinacridones, phthaloperinones, naphthaloperinones, phthalobenzimidazoles, naphthoylene-benzimidazoles, quinophthalones, naphthophthalones, metal-free and metal-containing monoazo, disazo and polyazo dyes, azomethine, polymethine, diarylmethane and triarylmethane dyes, azine, oxazine, thiazine and thiazole dyes. Metal pigments, including bronzes of all types and other metal powders, are not suitable for the process of the present invention.

The pigments are used in aqueous dispersion. The size of the pigment particles is in the usual range for coloring and printing textile material. Good results are achieved with pigments whose particle size is less than 20 microns. The amount of pigment may also be varied within the range conventionally used in the prior art methods. Up to 3% by weight of pigment with reference to the weight of fiber may be applied without difficulty. Colorations which contain up to 0.5% of pigment have particularly high fastness and are therefore preferred, while in the case of printing, the amount of pigment applied in the preferred embodiment may be twice as great, i.e. 1%, with reference to the weight of printed surface.

To stabilize the pigment dispersions it is necessary to use dispersing agents. It is preferred to use nonionic dispersing agents, for example adducts of alkylene oxides, particularly of ethylene oxide, to compounds containing a hydrophobic radical, particularly a hydrocarbon radical having ten to twenty carbon atoms, and a labile hydrogen atom attached to oxygen or nitrogen, a reactive carbon-carbon double bond or a carboxylic ester group, for example to fatty alcohols, alkylphenols, alkylnaphthols, fatty amines, fatty acids, fatty acid glycerides, fatty acid amides, fatty acid hydroxyalkylamides, resin acids and their esters. The following may be given as examples of such dispersing agents: the adducts of 24 moles of ethylene oxide to 1 mole of sperm oil alcohol, of 10 moles of ethylene oxide to 1 mole of butylnaphthol, of 38 moles of ethylene oxide to 1 mole of castor oil, of 30 moles of ethylene oxide to 1 mole of sperm oil alcohol and of 10 moles of ethylene oxide to 1 mole of oleylamine. Cation-active dispersing agents, such as the reaction product of 1 mole of oleylamine and 6 moles of ethylene oxide, which has been quaternized with dimethyl sulfate, may also be used; in general however they do not offer any special advantage over the nonionic dispersing agents. Strongly anion-active dispersing agents, for example water-soluble salts of fatty acids, alkanesulfonic acids, alkylsulfuric acids, alkylbenzenesulfonic acids, alkyl-naphthalenesulfonic acids and alkylene-bis-naphthalenesulfonic acids, cannot be used because they (like other strongly anion-active substances, for example polymers having free carboxylic or sulfonic acid groups or having such groups attached in salt form) would diminish or destroy the activity of the cationic polymers described above. It is however possible to use weakly anion-active dispersing agents, i.e., substances in which the action of an anionic group is so weakened by other groups in the molecule that they no longer interfere with the cationic polymers. Weakly anion-active dispersing agents are especially those obtainable from the abovementioned nonionic ethylene oxide adducts by simple esterification with polybasic acids, such as phosphoric acid, phthalic acid, maleic acid and particularly sulfuric acid, with possible neutralization of the unesterified acid groups. The sodium salt of the sulfuric acid hemiester of an adduct of 80 moles of ethylene oxide to 1 mole of sperm oil alcohol is an example of this type of dispersing agent. The dispersing agent may be used in amounts of 10 to 200%, preferably about 50%, based on the weight of the pigment.

The cationic polymers and the pigments are applied to the material to be colored from aqueous medium. The material may be first treated with the cationic polymer and then in a second operation with the pigment. In this two-stage method it has been found to be advantageous to impregnate the material to be colored first with an aqueous solution of the cationic polymer at 20° to 90° C., preferably by padding, to dry the material and then to color or print it with pigment by one of the methods hereinafter described. It is preferable, however, to apply the cationic polymer and the pigment to the fibrous material simultaneously by means of the same coloring or padding liquor or print paste. The advantage of this one-stage method lies not only in the saving of one operation but also in the fact that less cationic polymer is required, namely only 0.1 to 5 times the weight of the pigment, than in the two-stage method which requires an amount of cationic polymer which is 1 to 50 times the weight of pigment.

Coloring or printing of the fibrous material with the pigment dispersion containing dispersing agent of the abovementioned type and preferably the cationic polymer may be carried out in various ways. For coloring, the exhaustion method, the pad-batch method and preferably the padding method followed by heat treatment, are especially suitable.

In the exhaustion method, a long liquor is used which contains the finely divided pigment, the dispersing agent, if desired the cationic polymer and, when desirable, conventional coloring assistants which are not strongly anion-active. The material to be colored is introduced into this liquor at low temperature, for example at 30° C. The temperature of the liquor is then raised in the course of about thirty minutes to about 90° to 95° C. and coloring is continued for about one hour at this temperature.

In the padding method, a short liquor is used in the conventional way. The liquor, which in addition to the components provided in accordance with the invention (namely pigment, dispersing agent and if desired the cationic polymer) may also contain components commonly used in padding liquors, provided they are not too strongly anion-active, is padded onto the material to be colored on a padding machine at temperatures of up to 80° C., preferably at 20° to 60° C.; the impregnated material is squeezed out, generally to a liquor take-up of 70 to 100%.

If it is desired to use the pad-batch method, the padded and squeezed-out material is rolled up, isolated in a moisture-proof manner from the surroundings, for example by enclosing it in plastics sheeting, and leaving it for half to twenty hours at low temperature, preferably of from 20° to 40° C.; it is advantageous to rotate the material continuously.

It is preferable to subject the colored material to a heat treatment following padding and squeezing out. In the simplest case, this consists in drying the squeezed material at 60° to 80° C. Even in this case, colorations having optimum properties are obtained, so that in general more intense heat treatment is unnecessary. More intense heat treatment may however be desired for other reasons, for example when, with the liquor, heat-curable synthetic resin intermediates, as for example aminoplast forming substances of the type of methylol and methylol ether derivatives of carbamides, have been applied to the material to be colored. The material which has been padded and squeezed is then steamed at temperatures of from 100° to 120° C. for from three to twenty minutes or treated for one to fifteen minutes with hot air at 100° to 220° C.

It is also possible to print fibrous material according to the present invention. Print pastes are used for this purpose which contain finely divided pigment, dispersing agent, if desired cationic polymer and also a conventional printing thickener, for example alginate, methyl cellulose starch ether, carob bean flour ether, tragacanth thickening, crystal gum or an emulsion thickening of the oil-in-water type. Conventional printing assistants may also be used provided they are not strongly anion-active, for example phosphates, urea, glycerol or thiodiethylene glycol. The printed material is then treated in the usual way with steam for three to twenty minutes at 100° to 120° C. or with hot air at 60° to 220° C.

The colorations and prints thus obtained are above all distinguished by good light and wet fastness. If particularly good fastness to rubbing is desired, the treatment may, according to a preferred embodiment of the invention, be carried out with pigment dispersions which contain, in addition to the components already mentioned, small amounts of high molecular weight film-forming polymers, which are free from anionic groups, in nonionic or cationic dispersion.

"Small amounts" are defined as amounts which are about one-tenth to one-fifth of the amounts of film-forming polymers which are necessary in the conventional pigment coloring and printing methods and which are therefore insufficient to bind the pigment. In general amounts of 5 to 40 g. of such film-forming polymers per liter of coloring liquor or per kg. of print paste have proved to be very satisfactory.

For synthesizing the polymers, all monomers are suitable which yield copolymers which are soft and elastic at room temperature, for example vinyl esters of higher carboxylic acids, such as vinyl propionate, acrylic esters, methacrylic esters, for example methyl acrylate, ethyl acrylate, butyl acrylate, butyl methacrylate, and also butadiene and its homologues. These are polymerized alone or mixed with one another or copolymerized with other monomers, for example with maleic esters, fumaric esters, vinyl ethers, vinyl ketones, styrene, vinyl chloride, vinylidene chloride, vinyl acetate, acrylonitrile and methyl methacrylate. The polymers may also contain small amounts of polymerized units of water-soluble polymerizable compounds, such as vinylpyrrolidone, vinylimidazole or amides of unsaturated acids.

Coplymers have proved to be particularly suitable which have been prepared from comonomers bearing hydrocarbon radicals in which two adjacent carbon atoms have attached to them a hydroxyl group and a halogen atom. Examples of suitable comonomers having hydroxyl groups and halogen atoms on adjacent carbon atoms are compounds containing chlorohydrin groups which contain at least one polymerizable double bond, as for example esters of $\alpha\beta$-unsaturated organic acids, such as acrylic acid or methacrylic acid, with polyhydric alcohols having a halogen atom in $\alpha$-position to a free hydroxyl group, for example with 3-chloropropanediol-(1,2), (2,3)-dichlorobutanediol-(1,4), 3-chlorobutanetriol-(1,2,4), (1,4)-dichlorobutanediol-(2,3), 3-chloro-2-methylpropanediol-(1,2) or 3-chloro-2-chloromethylpropanediol-(1,2). 2-hydroxy-3-chloropropyl acrylate is particularly readily accessible and its use is of special industrial interest.

Comonomers which contain N-methylol groups or N-methylol ether groups, for example N-methylolacrylamide, N-methylolmethacrylamide and their ethers with low molecular weight alcohols, such as methanol, ethanol and butanol, may also be used for synthesizing the polymers.

Comonomers which contain anionic groups, such as acrylic acid, methacrylic acid, maleic acid, fumaric acid and their hemiesters and vinyl sulfonic acid are not suitable for synthesizing the polymers.

The film-forming polymers should be in the form of nonionic or cationic dispersions. For the production of these dispersions (which may be carried out by conventional methods, advantageously direct by emulsion polymerization of the monomers) only nonionic or cation-active dispersing agents are therefore suitable, for example the substances specified above for stabilizing the pigment dispersions.

The process with the coemployment of film-forming polymers is in other respects carried out in the same way as described above. When the film-forming polymers used contain reactive groups, it is advantageous to subject the colored or printed material to the action of heat at 100° to 220° C. for one to fifteen minutes.

It has proved to be particularly advantageous to soap the finished colored or printed material at boiling temperature in the conventional manner.

According to the process of the present invention, pigment colorations and pigment prints having excellent fastness may be obtained on fibrous material or cellulose or regenerated cellulose or on the cellulose or regenerated cellulose component of mixtures which also contain other fibers, as for example fibers of wool, cellulose esters, linear polyamides, linear polyesters and acrylonitrile polymers. The light fastness and wet fastness achieved are generally comparable with those obtainable with the same pigments by conventional methods using binders. Furthermore, excellent fastness to rubbing is achieved according to the preferred embodiment of this invention. Since in the present process the customary very high amounts of binder are omitted, the handle of the treated material is not unfavorably affected.

The following further advantages of the present process may be mentioned: it is more economical than the conventional prior art methods because large amounts of binder are not used; using the same pigments, purer shades are often obtained; and deeper shades are obtained when the same amount of pigment is used. Whereas in the prior art methods the quality of the end product is decisively influenced by the conditions under which crosslinking of the binder is carried out by the dyer or printer, simple drying at moderate temperature or a heat treatment the carrying out of which is not critical is sufficient in the present process to achieve reproducible fastness values. This means very much simpler and more reliable operation for the dyer and printer than has been the case heretofore.

The invention is illustrated by the following examples. The parts specified in the examples are parts by weight.

EXAMPLE 1

Cotton cloth is padded on a padding machine at 60° to 70° C. with a liquor which contains, in 1000 parts of water, 3 parts of finely divided copper phthalocyanine which is emulsified by means of 1.5 parts of the reaction product of 1 mole of sperm oil alcohol and 24 moles of ethylene oxide, and 2 parts of polyvinylimidazole which has been quaternized with dimethyl sulfate, and squeezed to a liquor retention of 80%. The cloth is then rolled up in moist condition, enclosed in plastics sheeting so that the whole is airtight, and stored for one hour. It is then rinsed and soaped at the boil.

A brilliant turquoise coloration is obtained which exhibits very good light fastness and wash fastness.

EXAMPLE 2

Cotton cloth is impregnated at 50° to 60° C. on a padding machine with a liquor which contains, in 1000 parts of water, 1 part of the finely divided condensation product of 1 mole of 1,4,5,8-naphthalenetetracarboxylic acid and 2 moles of o-phenylene diamine, which has been emulsified by means of 0.5 part of the reaction product of 1 mole of n-butylnaphthol and 10 moles of ethylene oxide, and 4 parts of a copolymer of 60 parts of vinylimidazole and 40 parts of acrylamide which has been quaternized with dimethyl sulfate, dried and then steamed for three minutes at 105° C.

A pure orange coloration having very good fastness properties is obtained.

EXAMPLE 3

100 parts of rayon staple fiber yarn is immersed in a liquor which contains, in 3000 parts of water, 1.5 parts of the finely divided disazo dye prepared from 1 mole of 3,3′-dichlorobenzidine diazotized and coupled with 2 moles of N-acetoacetyl-5-chloro-2-amino-1,4-dimethoxybenzene, which has been emulsified with 1 part of the reaction product of 1 mole of sperm oil alcohol and 15 moles of ethylene oxide, and 0.5 part of poly-N-vinyl-2-methylolimidazole which has been quaternized with methyl toluenesulfonate, heated from 40° C. to 90° to 95° C. and dyed at this temperature for one hour. The product is rinsed cold and soaped at the boil. A brilliant yellow coloration is obtained having excellent fastness properties.

EXAMPLE 4

Cotton cloth is padded on a padding machine with a liquor which contains, in 1000 parts of water, 10 parts of a pigment formulation having the following composition:

| | Parts |
|---|---|
| Finely divided monobromoisoviolanthrone | 2 |
| Reaction product of 1 mole of castor oil and 38 moles of ethylene oxide | 1.1 |
| Reaction product of 1 mole of urea and 2.6 moles of formaldehyde which has been etherified with 1 mole of butanediol-1,4 and with methanol | 2.6 |
| Copolymer of 80 parts of vinylimidazole and 20 parts of acrylonitrile which has been made quaternary with dimethyl sulfate | 3 |
| Water | 1.3 |

After impregnation, the cloth is squeezed out to 80% liquor retention, dried at 60° C. and then treated for five minutes at 140° C. with hot air.

A violet coloration is obtained which has excellent fastness properties in use and manufacture.

EXAMPLE 5

Cotton cloth is impregnated on a padding machine wih a solution which contains, in 1000 parts of water, 20 parts of polyvinylimidazole which has been made quaternary with dimethyl sulfate, squeezed out to 80% liquor retention and dried at 60° C. The cloth treated in this way is then padded with a liquor which contains, in 1000 parts of water, 4 parts of the finely divided azo dye prepared from 1 - amino - 2 - methoxybenzene-5-carboxylic-phenylamide diazotized and coupled with 1-(2',3'-oxynaphthoylamino)-2,5-dimethoxy - 4 - chlorobenzene. The cloth is then dried at 60° to 80° C., rinsed and soaped.

A bright red coloration having very good fastness properties is obtained.

EXAMPLE 6

Cotton cloth is printed with a paste having the following composition:

| | Parts |
|---|---|
| 4,4'-dimethyl-6,5',7'-trichlorothioindigo | 15 |
| Polyvinylimidazole made quaternary with dimethyl sulfate | 25 |
| Parts of 5% alginate thickening | 120 |
| Parts of diammonium phosphate | 20 |
| Parts of the sodium salt of the sulfuric acid hemiester of a reaction product of 1 mole of sperm oil alcohol and 80 moles of ethylene oxide | 30 |
| Water | 790 |
| | 1000 |

The cloth is then dried and steamed for five minutes at 103° C. A pure rose print is obtained having very good light fastness and wash fastness.

EXAMPLE 7

100 parts of cotton yarn is colored in a liquor containing (in 3000 parts of water) 5 parts of a polyvinylimidazole made quaternary with dimethyl sulfate and 5 parts of a pigment formulation having the following composition:

| | Parts |
|---|---|
| $Fe_2O_3$ | 1.4 |
| Gas black | 0.25 |
| Reaction product of 1 mole of sperm oil alcohol with 25 moles of ethylene oxide | 0.7 |
| Glycerol | 0.25 |
| Sodium hexa-m-phosphate | 0.05 |
| Water | 2.55 |

Coloring is commenced at 30° to 40° C., the temperature is raised to 90° to 95° C. during the course of twenty minutes and dyeing is continued at this temperature for another forty-five minutes.

A brown coloration is obtained having very good fastness properties.

EXAMPLE 8

Cotton cloth is impregnated at 50° to 60° C. on a padding machine with a liquor which contains (in 1000 parts of water):

| | Parts |
|---|---|
| Finely divided copper phthalocyanine which has been emulsified by means of 1.5 parts of the reaction product of 1 mole of sperm oil alcohol and 24 moles of ethylene oxide | 3 |
| Polyvinylimidazole made quaternary with dimethyl sulfate | 2 |
| Copolymer of 90 parts of butyl acrylate, 7 parts of acrylonitrile and 3 parts of 3-chloro-2-hydroxypropyl acrylate, which has been emulsified by means of 15 parts of the reaction product of 1 mole of oleylamine and 6 moles of ethylene oxide | 15 | squeezed out to 80% liquor retention, dried at 60° C. and then treated for five minutes with hot air at 140° C. A turquoise blue coloration is obtained which has not only very good light fastness and good wet fastness properties but also excellent fastness to rubbing.

We claim:
1. A process for coloring and printing cellulosic fibrous material with nonmetallic pigments which comprises applying to said material an aqueous solution of (a) a compound from the class consisting of quaternary polymers and copolymers of vinylimidazole and an aqueous dispersion of (b) a nonmetallic pigment which contains (c) a dispersing agent selected from the group consisting of ethylene oxide adducts and their sulfuric acid hemiesters, in the absence of strongly anion-active substances, the weight ratio of (a):(b) being from 0.1:1 to 50:1 and the weight ratio of (c):(b) being from 0.1:1 to 2:1, said compound being present when said pigment is applied.

2. A process as claimed in claim 1 wherein components (a), (b), and (c) are padded onto the fibrous material from a common liquor and the impregnated material is subjected to a heat treatment at 60° to 220° C.

3. A process as claimed in claim 1 wherein component (a) is quaternary poly-N-vinylimidazole.

4. A process as claimed in claim 1 wherein component (a) is a quaternary copolymer of a vinylimidazole and at least one monomer selected from the group consisting of acrylonitrile, acrylic acid esters, methacrylic acid esters, acrylamide, methacrylamide, styrene and vinylpyrrolidone.

5. A process as claimed in claim 1 in which said dispersion of (b) and (c) is applied after (a).

6. A process as claimed in claim 1 in which said aqueous dispersion of (b) and (c) also contains (d) a high molecular weight film-forming polymer free from anionic groups in an aqueous dispersion from the class consisting of nonionic and cationic dispersions in amounts up to 40 grams per liter where the pigment is dispersed in a coloring liquor and in amounts up to 40 grams per kilogram where the pigment is applied in the form of a printing paste.

7. A process as claimed in claim 6 wherein component (d) is a copolymer prepared from comonomers having hydroxyl groups and halogen atoms on adjacent carbon atoms, and which contain at least one polymerizable double bond.

References Cited

UNITED STATES PATENTS

| 3,132,965 | 5/1964 | Schmidt et al. | 117—38 |
| 3,266,931 | 8/1966 | Zimmermann et al. | 117—38 X |
| 2,861,863 | 11/1958 | Schuster et al. | 260—88.3 X |
| 2,883,304 | 4/1959 | Kine et al. | 117—143 X |
| 2,961,349 | 11/1960 | Bartl et al. | 117—143 X |

WILLIAM D. MARTIN, Primary Examiner

H. J. GWINNELL, Assistant Examiner

U.S. Cl. X.R.

117—145, 161